(12) United States Patent
Satoh

(10) Patent No.: US 7,163,344 B2
(45) Date of Patent: Jan. 16, 2007

(54) LIGHT QUANTITY ADJUSTING APPARATUS AND IMAGE-PICKUP APPARATUS

(75) Inventor: Hironobu Satoh, Chiba (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 566 days.

(21) Appl. No.: 10/684,931

(22) Filed: Oct. 14, 2003

(65) Prior Publication Data

US 2004/0076419 A1    Apr. 22, 2004

(30) Foreign Application Priority Data

Oct. 17, 2002    (JP)    ............................. 2002/302856

(51) Int. Cl.
    *G03B 9/14*    (2006.01)
(52) U.S. Cl. ...................................... 396/497

(58) Field of Classification Search ................ 396/452, 396/493, 497, 500, 501
See application file for complete search history.

(56) References Cited

U.S. PATENT DOCUMENTS 4,348,092 A * 9/1982 Hirohata et al. ............. 396/449
6,933,980 B1 * 8/2005 Matsumoto ................. 348/363

* cited by examiner

*Primary Examiner*—W. B. Perkey
(74) *Attorney, Agent, or Firm*—Cowan, Liebowitz & Latman, P.C.

(57) ABSTRACT

A light quantity adjusting apparatus which comprises a light-shielding member and a driving unit which drives the opening/closing of the light-shielding member is disclosed. Herein, the light-shielding member is provided with a reinforcement member attached to a partial range including an area liable to deterioration due to repeated opening/closing driving operations.

8 Claims, 5 Drawing Sheets

LIGHT QUANTITY ADJUSTING APPARATUS AND IMAGE-PICKUP APPARATUS

BACKGROUND OF THE INVENTION

1. Field of the Invention

The present invention relates to a light quantity adjusting apparatus such as a shutter apparatus or diaphragm apparatus mounted in an image-pickup apparatus such as a digital camera, and an improvement of an image-pickup apparatus provided with the light quantity adjusting apparatus.

2. Description of the Related Art

A camera which uses an image-pickup element has a narrow dynamic range and is therefore required to have a high shutter speed for adjusting the light quantity for a high degree of brightness.

However, problems caused by increasing the shutter speed include deterioration of light-shield blades. One of conventionally known methods for solving this problem is a method of increasing the thickness of the light-shield blades.

However, the light-shield blades are structured by punching out a sheet member made of polyester, etc., created into a uniform thickness, and therefore the thickness of the light-shield blades as a whole increases. As a result, the weight of portions unnecessary for reinforcement also increases, which is disadvantageous in increasing the shutter speed.

The same problem occurs with a diaphragm apparatus whose aperture diameter is changed by opening/closing the light-shield blades when the driving speed of the light-shield blades is increased.

SUMMARY OF THE INVENTION

The present invention has been implemented against such a background and it is intended to provide a shutter apparatus capable of improving durability of light-shielding blades without sacrificing the speed enhancement of the shutter speed. This is applicable not only to a shutter apparatus but also to a diaphragm apparatus having light-shielding blades, which adjusts the quantity of light passing therethrough.

The present invention is intended to provide a light quantity adjusting apparatus comprising a light-shielding member and a driving unit which drives the opening/closing of the light-shielding member. The apparatus is characterized in that the light-shielding member is provided with a reinforcement member in part of an area including a portion liable to deterioration caused by repeated opening/closing driving operations, and also provide an image-pickup apparatus provided with the light quantity adjusting apparatus.

The light quantity adjusting apparatus preferably includes a bump member which collides with the light-shielding member to restrict the driving range of the light-shielding member. In the apparatus, the reinforcement member is provided in a location where it contacts the bump member on the light-shielding member.

Furthermore, the light-shielding member preferably includes a first hole portion forming a fulcrum of rotation and a second hole portion forming a point of action for rotation. The reinforcement member is provided around the first and second hole portions.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

Hereinafter, the present invention will be explained in more detail based on a preferred embodiment illustrated below.

Figure 1:
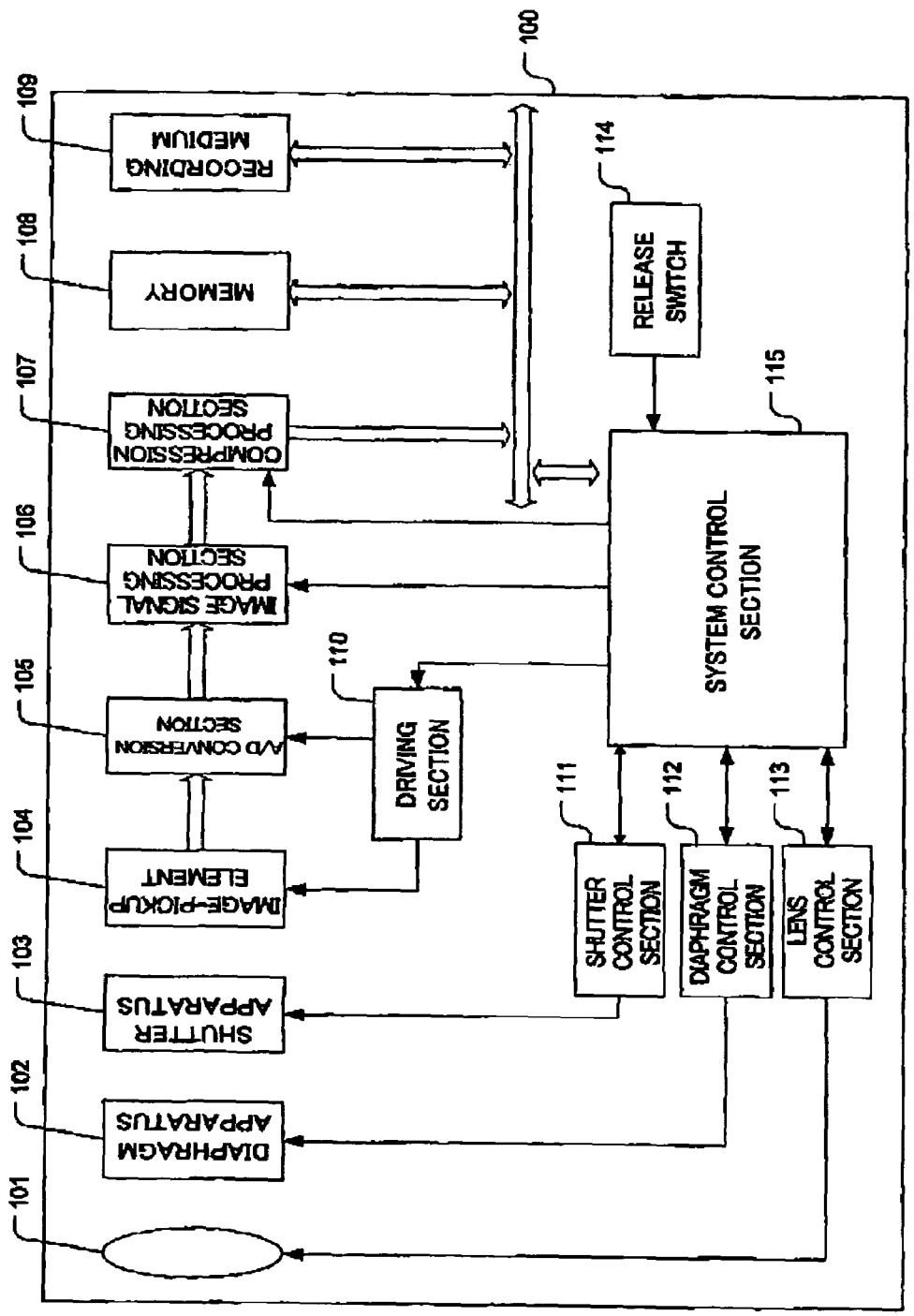
FIG. 1 is a block diagram of a digital camera.

FIG. 1 is a block diagram of a digital camera 100 which is an image-pickup apparatus.

In FIG. 1, reference numeral 101 denotes a lens unit which forms an image with incident light on an image-pickup element 104 such as a CCD or CMOS sensor, 102 denotes a diaphragm apparatus which changes the quantity of incident light which reaches the image-pickup element 104. Reference numeral 103 denotes a shutter apparatus which acts to prevent the incident light from reaching the image-pickup element 104. Reference numeral 105 denotes an A/D conversion section (circuit) which converts an output signal of the image-pickup element 104 to a digital value to obtain image data. Reference numeral 106 denotes an image signal processing section (circuit) which applies processing such as gamma correction, etc., to the image data output from the A/D conversion section. Reference numeral 107 denotes a compression processing section (circuit) which compresses the image data output from the image signal processing section 106.

Reference numeral 108 denotes a memory which temporarily saves the image data obtained at the compression processing section 107. Reference numeral 109 denotes a recording medium which stores the image data in the memory 108 and may be either fixed to the image-pickup apparatus or may be detachable. Reference numeral 110 denotes a driving section (circuit) which drives the image-pickup element 104 and the A/D conversion section 105.

Reference numeral 111 denotes a shutter control section (circuit) which controls and drives the shutter blades (light-shielding members) to enable/disable the incident light to reach the image-pickup element 104. Reference numeral 112 denotes a diaphragm control section (circuit) which controls and drives the diaphragm blades (light-shielding members or ND filter) which regulate the quantity of incident light on the image-pickup element 104. Reference numeral 113 denotes a lens control section (circuit) which drives the lens unit 101 to adjust the focal length.

Reference numeral 114 denotes a release switch which instructs the start of image pickup. Reference numeral 115 denotes a system control section (circuit) which controls the overall operation of the digital camera 100.

The system control section 115 performs control according to the operation of the release switch 114, adjusts the focal length and the amount of exposure, controls data writing to/data reading from the memory 108 and the storage medium 109, etc. By reading and executing a predetermined program, the system control section 115 executes the functions of this embodiment.

Figure 2:
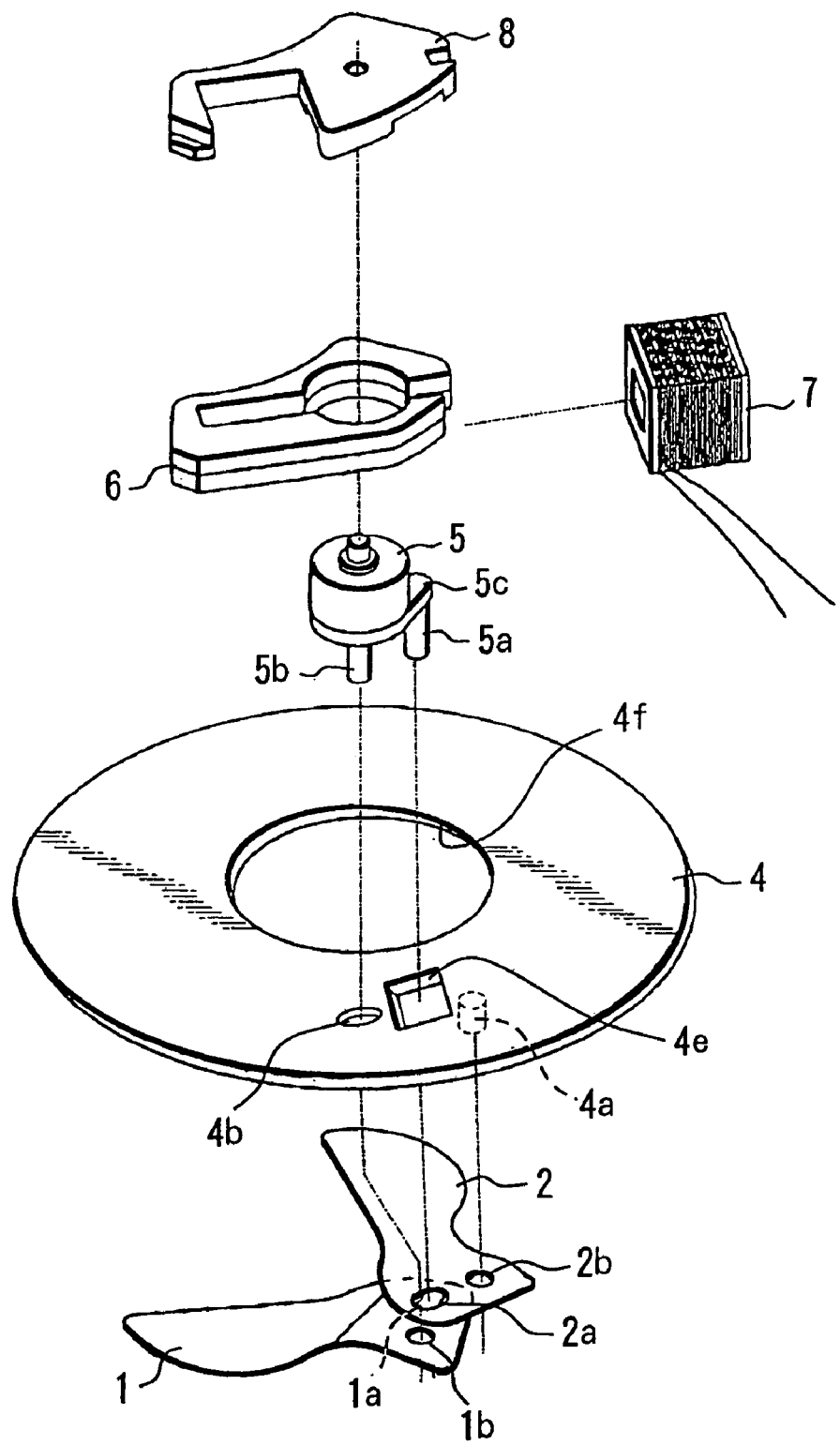
FIG. 2 is an exploded perspective view showing principal components of a shutter apparatus according to one embodiment of the present invention.
Figure 3:
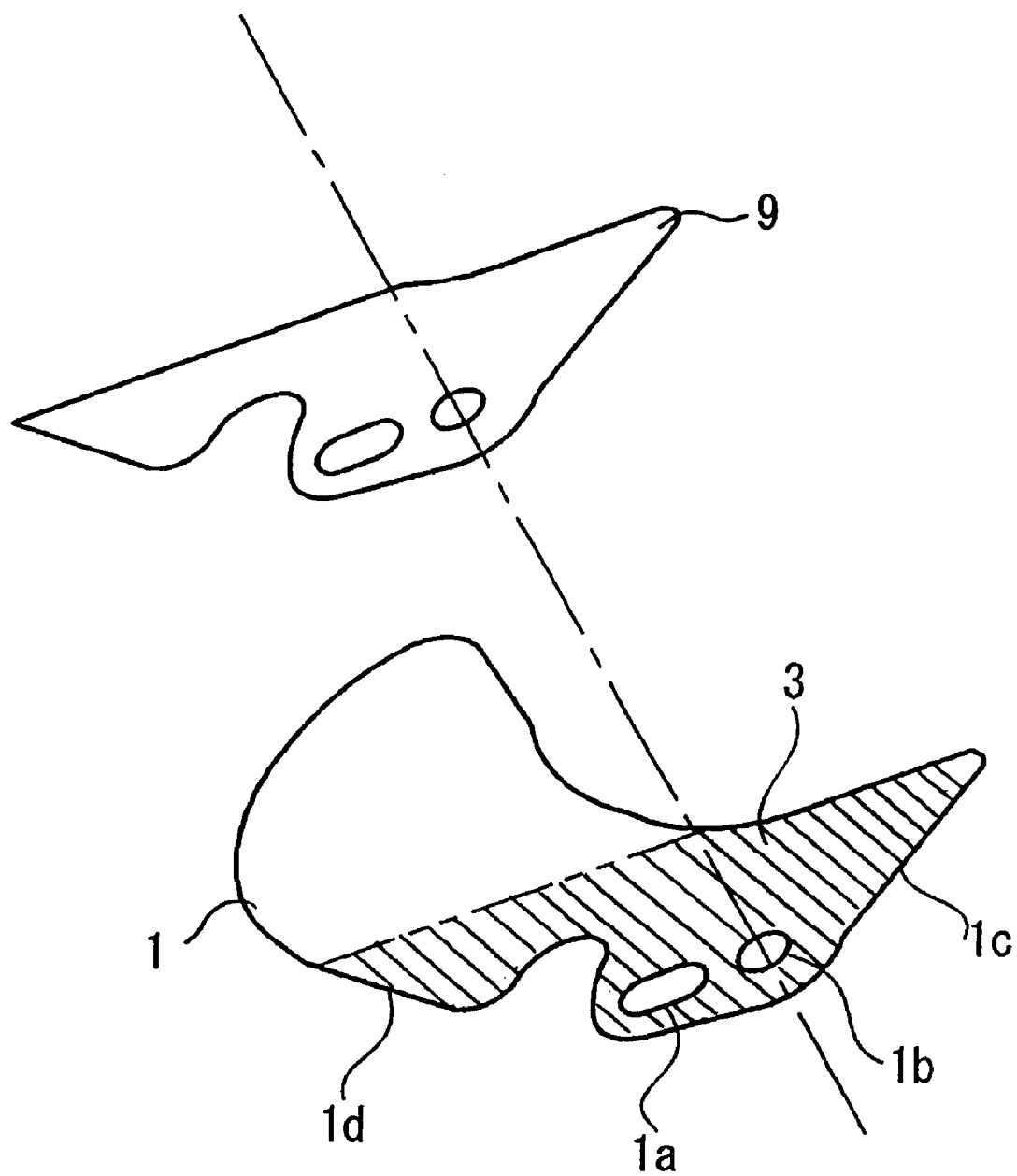
FIG. 3 is a perspective view showing a structure of a shutter blade of the shutter apparatus in FIG. 2.
Figure 4:
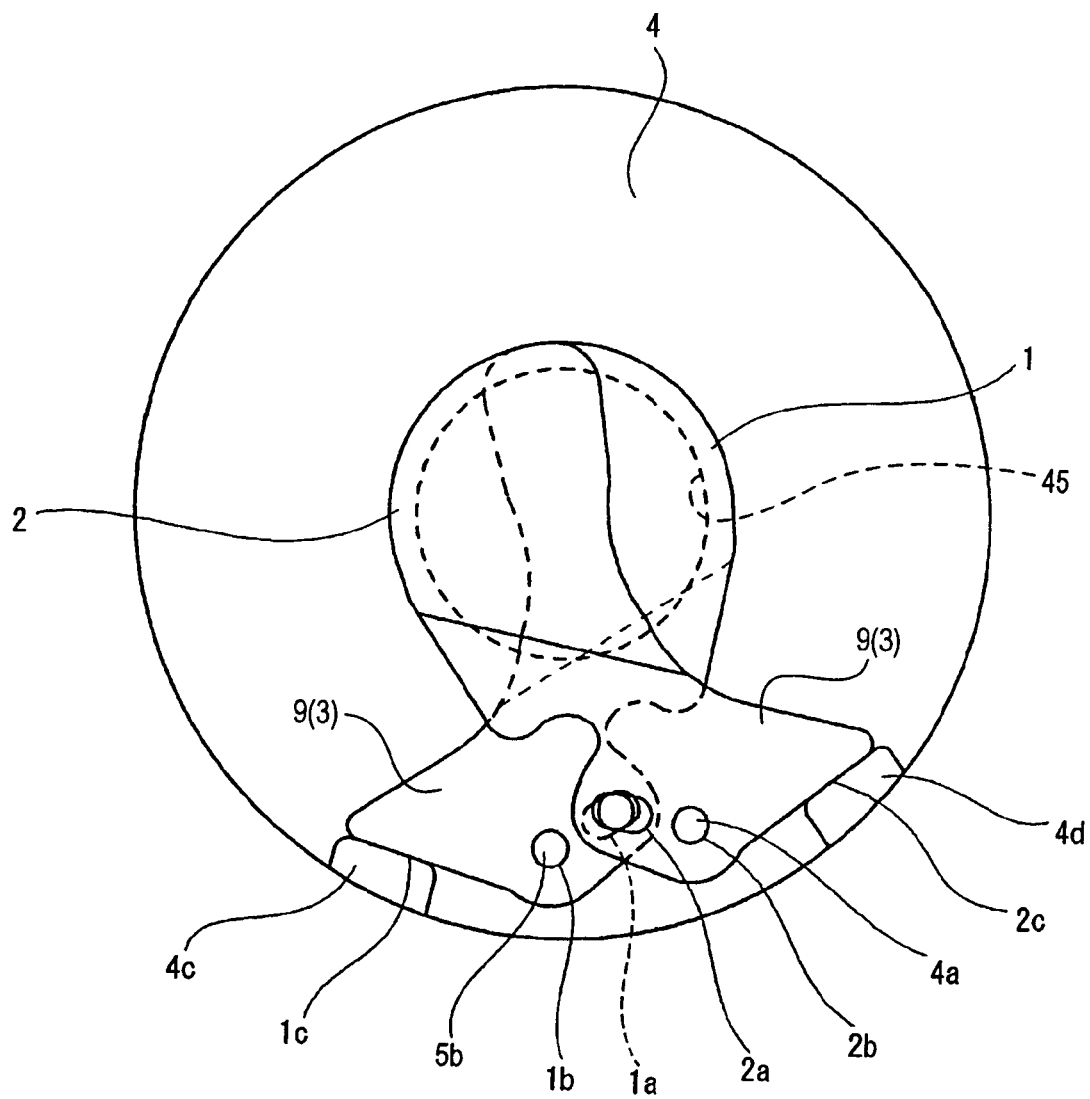
FIG. 4 is a front view of the shutter apparatus when the shutter blades of the shutter apparatus in FIG. 2 are fully closed.
Figure 5:
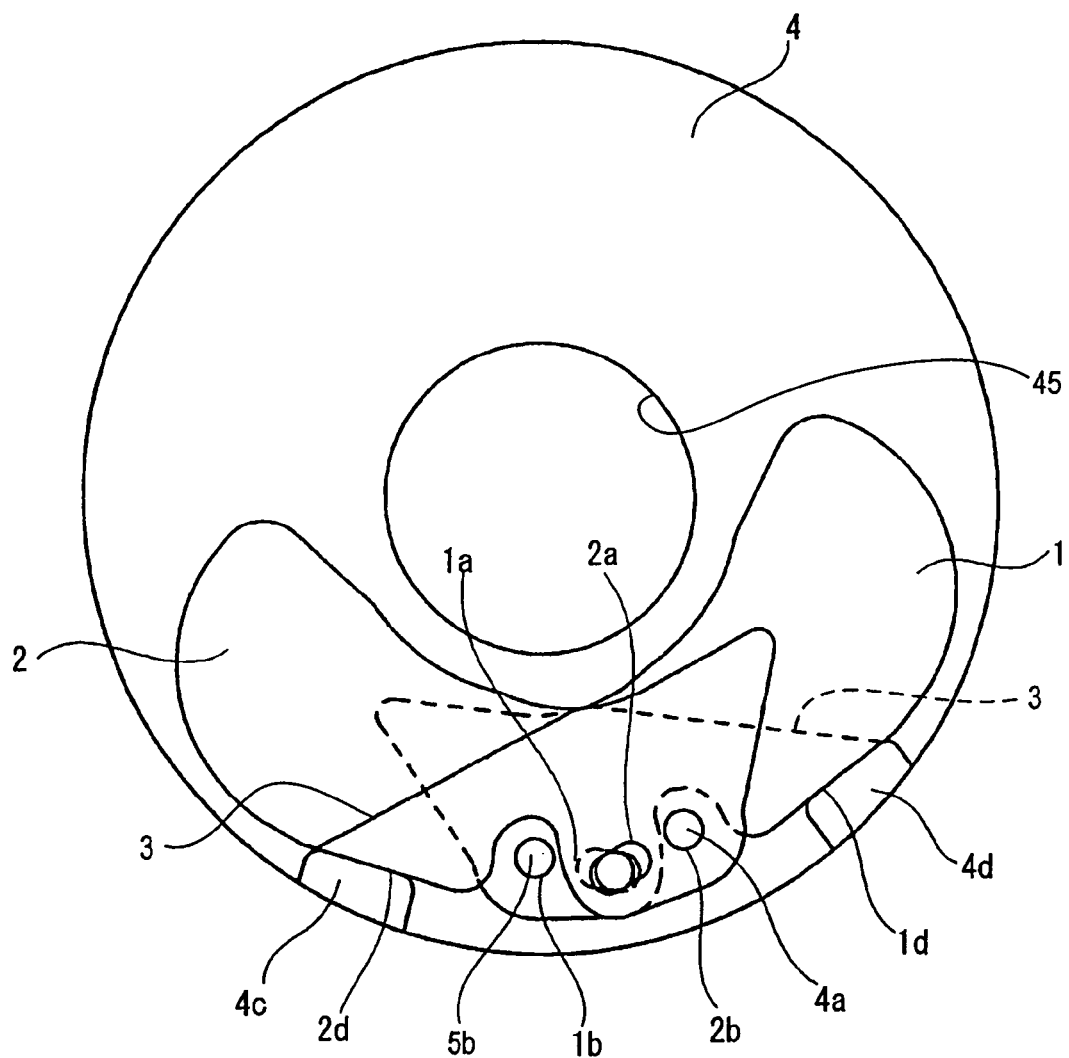
FIG. 5 is a front view of the shutter apparatus when the shutter blades of the shutter apparatus in FIG. 2 are fully opened.

FIGS. 2 to 5 relate to the shutter apparatus 103 according to an embodiment of the present invention. FIG. 2 is an exploded perspective view showing principal components of the shutter apparatus 103, FIG. 3 is a perspective view showing a structure of a light-shield blade (herein, referred to as a "shutter blade"), FIG. 4 is a front view of the shutter apparatus 103 when the shutter blades are fully closed and FIG. 5 is a front view of the shutter apparatus 103 when the shutter blades are fully opened.

The shutter blades 1 and 2 have long hole portions 1a and 2a and hole portions 1b and 2b, respectively. A driving lever 5c is fixed to a rotating shaft (a first shaft) 5b of the magnet motor 5 and rotates integrally with the rotating shaft 5b. A lever pin 5a is formed on the driving lever 5c as its integral part at a position away from the rotating shaft 5b. The rotating shaft 5b is inserted in a through hole portion 4b formed in a base plate 4 so as to pass therethrough, and is engaged with the hole portion 1a of the shutter blade 1. The lever pin 5a is inserted in a quadrangular opening portion 4e formed in the base plate 4 so as to pass therethrough, and is engaged with the long hole portions 1a and 2a of the shutter blades 1 and 2. The base plate 4 has a pin (a second shaft) 4a on the side of the shutter blades 1 and 2. The pin 4a is engaged with a hole portion 2b of the shutter blade 2. By this structure, the hole portions 1b and 2b act as fulcrums and the long hole portions 1a and 2a act as points of action.

The magnet rotor 5 together with a coil 7 and a yoke 6 into which the coil 7 is inserted forms a driving unit for the shutter blades 1 and 2. Thus, when the magnet rotor 5 rotates, the lever pin 5a also rotates together, and therefore the shutter blades 1 and 2 rotate (drive the opening/closing) around the hole portions 1b and 2b engaged with the rotating shaft 5b and the pin 4a, respectively. The top end (in FIG. 2) of the magnet rotor 5 is supported to a bearing 8 in a rotatable manner and the bottom end is supported by a hole portion 4b provided in the base plate 4 in a rotatable manner.

Here, the structures of the shutter blades 1 and 2 will be explained in detail using FIG. 3. FIG. 3 shows only the shutter blade 1 as the representative of the shutter blades 1 and 2 having the same structure.

Using an adhesive, a reinforcement member 9 is attached only to a partial area 3 shown with hatching in FIG. 3, which includes the long hole portion 1a, hole portion 1b and bump portions 1c and 1d which bump into stoppers 4c and 4d of the base plate 4 when the shutter blade 1 opens/closes as will be described later. The partial area is an area liable to deterioration. The reinforcement member 9 is also attached to the shutter blade 2 as with the shutter blade 1. The reinforcement member 9 need not be made of the same material as that of the shutter blades 1 and 2. Furthermore, the method of attaching the reinforcement member 9 to the shutter blades 1 and 2 is not limited to the use of an adhesive.

As shown above, attaching the reinforcement member 9 only to the partial area 3 which includes an area liable to deterioration (damage) due to repeated opening/closing driving operations of the shutter blades 1 and 2 prevents the weights of the shutter blades 1 and 2 from increasing more than necessary. This makes it possible to suppress a decrease in a shutter speed to a minimum level, suppress deterioration of the shutter blades 1 and 2 and improve durability thereof.

In the shutter apparatus having the above described structure, when power is supplied to the coil 7, by the magnetic action with the yoke 6, the magnet rotor 5 rotates in a direction according to the power supplying direction. This causes the lever pin 5a inserted in the long hole portions 1a and 2a of the shutter blades 1 and 2 to rotate, and therefore the shutter blades 1 and 2 rotate around the hole portions 1b and 2b respectively in their rotation directions from, for example, the full-closed state in FIG. 4 to the full-open state in FIG. 5. On the other hand, when power is reversely supplied to the coil 7, the magnet rotor 5 rotates in the opposite direction. The lever pin 5a also rotates in the opposite direction, and therefore the shutter blades 1 and 2 rotate from the full-open state in FIG. 5 to the full-closed state in FIG. 4. Herein, in the reinforcement member 9, the area which do not cover the opening (aperture) portion 4f of the base plate 4 is much larger than the area which covers the opening portion 4f during opening/closing driving operation.

On the other hand, when the shutter blades 1 and 2 are rotated from the full-open state to the full-closed state, the bump portion 1c of the shutter blade 1 collides with the stopper 4c of the base plate 4 as shown in FIG. 4 and the bump portion 2c of the shutter blade 2 collides with the stopper 4d of the base plate 4 as shown in FIG. 4. On the other hand, when the shutter blades 1 and 2 are rotated from the full-closed state to the full-open state, the bump portion 1d of the shutter blade 1 collides with the stopper 4d of the base plate 4 as shown in FIG. 5 and the bump portion 2d of the shutter blade 2 collides with the stopper 4c of the base plate 4 as shown in FIG. 5.

When repeated, the above described opening/closing operations may be a factor to cause deterioration (damage) of the area where the shutter blades 1 and 2 (bump portions 1c, 2c, 1d and 2d) colliding with the base plate 4 and the area of engagement (long hole portions 1a and 2a, hole portions 1b and 2b). However, according to the embodiment of the present invention, as shown in FIG. 3, since the reinforcement member 9 is attached only to the partial area 3 including the area expressed with hatching, including the portions 1a to 1d and 2a to 2d of the shutter blades 1 and 2 which is liable to deterioration if no reinforcement member is attached, it is possible to suppress deterioration (damage) of the portions that collide with the stoppers 4c and 4d of the base plate 4 (bump portions 1c, 2c, 1d and 2d) and engagement portions (long hole portions 1a and 2a, hole portions 1b and 2b) and improve their durability. The long hole portions 1a and 2a are portions to which a driving force is transmitted by the driving unit. The hole portions 1b and 2b are portions which become the rotation centers of the shutter blades 1 and 2. The bump portions 1c and 2c, and 1d and 2d are portions which collide with the stoppers 4c and 4d that stop or support the shutter blades 1 and 2.

The area to which the reinforcement member 9 is attached may be only 1a to 1d and 2a to 2d of the shutter blades 1 and 2, but doing so is disadvantageous in terms of working efficiency, etc., and therefore the reinforcement member 9 is attached to the area that includes these portions (the partial area 3).

According to this embodiment, since the reinforcement member 9 for the shutter blades 1 and 2 is attached only to the partial area 3 which is the area expressed with hatching and which is liable to deterioration including the long hole portions 1a and 2a to which a driving force is transmitted by the driving unit, hole portions 1b and 2b which become the rotation centers and the bump portions 1c and 2c, and 1d and 2d which collide with the stoppers 4c and 4d which stop or support the shutter blades 1 and 2, it is possible to suppress a decrease in the shutter speed to a minimum level without increasing the weight of the shutter blades 1 and 2 more than necessary. As a result, it is possible to prevent speed enhancement of the shutter speed from being sacrificed.

As shown above, according to the above described structure, it is possible to provide a shutter apparatus capable of improving durability of the shutter blades without sacrificing the speed enhancement of the shutter speed.

The present invention is also applicable to the diaphragm apparatus 102 which changes the size of the aperture formed by the light-shield blades (hereinafter referred to as the "diaphragm blades") by driving the diaphragm blades. For example, in the state shown in FIG. 4, if the diaphragm blades are formed so that an aperture is created in only part of the center of the opening of the base plate 4, it is possible to provide a diaphragm apparatus capable of controlling the aperture in two sizes while the other parts continue to have the same structure as that of the shutter apparatus shown in FIGS. 2 to 4.

The present invention is not limited to the above embodiments and various changes and modifications can be within the spirit and scope of the present invention. Therefore, to apprise the public of the scope of the present invention the following claims are made.

What is claimed is:

1. A light quantity adjusting apparatus comprising:
   a light-shielding member; and
   a driving unit which drives the opening and closing of the light-shielding member,
   wherein the light-shielding member is provided with a reinforcement member attached to a partial area including a portion liable to deterioration due to repeated opening and closing driving operations; and
   wherein the light-shielding member comprises a first hole portion which forms a fulcrum of rotation and a second hole portion which forms a point of action, and the reinforcement member is provided around the first and second hole portions.

2. The light quantity adjusting apparatus according to claim 1, further comprising a bump member which restricts the driving range of the light-shielding member by colliding with the light-shielding member,
   wherein the reinforcement member is provided in a portion in contact with the bump member, of the light-shielding member.

3. The light quantity adjusting apparatus according to claim 1, further comprising a base plate in which an aperture portion is formed,
   wherein, in the reinforcement member an area which do not cover the aperture portion is larger than an area which covers the aperture portion when the light-shielding member is driven to open and close.

4. The light quantity adjusting apparatus according to claim 1, wherein the driving unit is a motor, the rotor of the motor is provided with a first shaft provided at the center of rotation and a second shaft provided away from the center of rotation, the first shaft is inserted in the first hole portion and the second shaft is inserted in the second hole portion.

5. The light quantity adjusting apparatus according to claim 4, further comprising a base plate provided with an aperture portion and a shaft portion, and another light-shielding member,
   wherein the other light-shielding member is provided with a first hole portion which forms a fulcrum of rotation and a second hole portion which forms a point of action, the shaft portion provided on the base plate is inserted in the first hole portion of the other light-shielding member and the second shaft provided in the rotor is inserted in the second hole portion of the other light-shielding member.

6. The light quantity adjusting apparatus according to claim 1, further comprising a base plate in which an aperture portion is formed,
   wherein the light-shielding member is a shutter blade and closes to a position where it completely covers the aperture portion.

7. The light quantity adjusting apparatus according to claim 1, further comprising a base plate in which an aperture portion is formed,
   wherein the light-shielding member is a diaphragm blade and closes to a position where it partially covers the aperture portion.

8. An image-pickup apparatus comprising:
   an image-pickup element;
   a light quantity adjusting apparatus which regulates the quantity of incident light which reaches the image-pickup element, the light quantity adjusting apparatus comprising a light-shielding member and a driving unit which drives the opening and closing of the light-shielding member,
   wherein the light-shielding member is provided with a reinforcement member in a partial area including a portion which is liable to deterioration due to repeated opening and closing driving operations; and
   wherein the light-shielding member comprises a first hole portion which forms a fulcrum of rotation and a second hole portion which forms a point of action, and the reinforcement member is provided around the first and second hole portions.

* * * * *